(12) United States Patent
Craig (10) Patent No.: US 7,593,855 B1
(45) Date of Patent: Sep. 22, 2009

(54) CONSUMPTIBLE IDENTIFICATION SYSTEM AND METHOD

(76) Inventor: Joseph L. Craig, 4652 Patrick Rd., West Bloomfield, MI (US) 48322

(*) Notice: Subject to any disclaimer, the term of this patent is extended or adjusted under 35 U.S.C. 154(b) by 912 days.

(21) Appl. No.: 10/449,860

(22) Filed: May 30, 2003

(51) Int. Cl.
*G06Q 30/00* (2006.01)
(52) U.S. Cl. ......................................... 705/1
(58) Field of Classification Search ............. 705/1
See application file for complete search history.

(56) References Cited

U.S. PATENT DOCUMENTS

| | | | | |
|---|---|---|---|---|
| 6,236,990 | B1* | 5/2001 | Geller et al. | 707/5 |
| 7,191,143 | B2* | 3/2007 | Keli et al. | 705/10 |
| 2001/0044743 | A1* | 11/2001 | McKinley et al. | 705/14 |
| 2002/0046147 | A1* | 4/2002 | Livesay et al. | 705/37 |
| 2002/0065721 | A1* | 5/2002 | Lema et al. | 705/14 |
| 2002/0087388 | A1* | 7/2002 | Keil et al. | 705/10 |
| 2003/0040952 | A1* | 2/2003 | Keil et al. | 705/10 |
| 2003/0074253 | A1* | 4/2003 | Scheuring et al. | 705/10 |

OTHER PUBLICATIONS

Bacon, Donald R., "A Comparison of Approaches to Importance-Performance Analysis," International Journal of Market Research, 2003 Quarter 1, vol. 45, Issue 1, pp. 55-71.*

* cited by examiner

*Primary Examiner*—John W Hayes
*Assistant Examiner*—Nathan Erb
(74) *Attorney, Agent, or Firm*—Harness, Dickey & Pierce, PLC (57) ABSTRACT

A consumptible identification system for use with a computer network includes a need prioritization module adapted to obtain a prioritization of consumer needs associated with a consumptible category from a particular consumer, wherein the prioritization expresses a preference of the particular consumer pertaining to at least one need associated with the category relative to at least one other need associated with the category. It further includes a matching module adapted to match a consumptible identity to the particular consumer based on the prioritization of consumer needs and relationships between consumer needs and consumptible identities associated with the consumptible category. In addition, it has a user interface adapted to communicate the consumptible identity to the particular consumer.

12 Claims, 7 Drawing Sheets

| NEED PRIORITY | ATTRIBUTE 1 | ATTRIBUTE 2 | ATTRIBUTE 3 | ATTRIBUTE 4 |
|---|---|---|---|---|
| ◎ = 9 ○ = 3 △ = 1 | | | | |
| NEED 1  0.20 | ○ | △ | | ◎ |
| NEED 2  0.30 | △ | ○ | ◎ | |
| NEED 3  0.10 | | ○ | ○ | ◎ |
| NEED 4  0.40 | ◎ | | △ | ○ |
| ATTRIBUTE PRIORITY | 4.5 | 2.0 | 3.0 | 2.4 |

Figure - 3B

| APRIORITY ATTRIBUTE | CONSUMPTIBLE 1 | CONSUMPTIBLE 2 | CONSUMPTIBLE 3 | CONSUMPTIBLE 4 |
|---|---|---|---|---|
| 1 — 10 | | | | |
| ATTRIBUTE 1  4.5 | 1 | 5 | 7 | 3 |
| ATTRIBUTE 2  2.0 | 7 | 3 | 1 | 5 |
| ATTRIBUTE 3  3.0 | 3 | 1 | 5 | 7 |
| ATTRIBUTE 4  2.4 | 5 | 7 | 3 | 1 |
| CONSUMPTIBLE PRIORITY | 29.9 | 48.3 | 55.7 | 27.9 |

CONSUMPTIBLE IDENTIFICATION SYSTEM AND METHOD

FIELD OF THE INVENTION

The present invention generally relates to computer networked consumer and seller matching systems and methods, and particularly relates to identification of a consumptible based on a prioritization of consumer needs relating to the consumptible that expresses a relative preference of the consumer pertaining to the needs.

BACKGROUND OF THE INVENTION

Today's Internet search tools may be successful at helping a consumer find a consumptible, such as a product or service, according to specific consumptible attributes. For example, a consumer accessing a searchable web site providing listings for houses may obtain a list of homes in a consumer-specified area that match search criteria for price, number of bedrooms, number of baths, square footage, and similar search criteria that are objectively measurable in a directly quantifiable fashion. Similarly, one may expect in other domains to obtain, for example, an identification of an automobile based on price, horsepower, wheelbase, torque, towing capacity, and similar criteria that are objectively measurable in a directly quantifiable fashion. Today's tools, however, suffer from the need to require a particular consumer to identify an appropriate set of consumptible attributes with specific values and/or value ranges when searching for a matching consumptible. As a result, today's tools fail to accurately match a consumptible to a particular consumer's subjectively perceptible needs relating to consumer benefits derived from one or more consumptible attributes.

Today's Internet search tools are unsuitable for assisting consumers in making decisions because consumers needing assistance in identifying a consumptible that meets their individual needs typically may not be experts in fields relating to the corresponding consumptible categories. As a result, they typically lack the expertise required to translate their subjectively perceived needs relating to customer benefits into the consumptible attributes and associated performance values from which those benefits are derived. Therefore, the need remains for a consumptible identification system and method that successfully matches a consumptible identity to a particular consumer based on a prioritization of consumer needs and expertly identified relationships between consumer needs and consumptible identities associated with the consumptible category. The present invention fulfills this need.

SUMMARY OF THE INVENTION

In accordance with the present invention, a consumptible identification system for use with a computer network includes a need prioritization module adapted to obtain a prioritization of consumer needs associated with a consumptible category from a particular consumer, wherein the prioritization expresses a preference of the particular consumer pertaining to at least one need associated with the category relative to at least one other need associated with the category. It further includes a matching module adapted to match a consumptible identity to the particular consumer based on the prioritization of consumer needs and relationships between consumer needs and consumptible identities associated with the consumptible category. In addition, it has a user interface adapted to communicate the consumptible identity to the particular consumer.

The present invention is advantageous over previous networked consumer assistance tools in that it may identify consumptibles based on needs of particular consumers without requiring that the consumer translate their individual needs into specific values of consumptible attributes. It is further advantageous in that it may prompt consumers to visually compare consumer needs for a given consumptible category, thereby obtaining a consumer-specific prioritization of expertly identified needs that may have been expertly correlated to existing consumptible performance attributes and consumptibles. The foregoing advantage may be further developed by permitting a consumer to select or otherwise specify a subset of predetermined needs from a superset of predetermined needs for the consumptible category, thereby quickly focusing the need comparison and consumptible identification procedure. The present invention may still be further advantageous in that it may allow experts to separately control for variability in consumer needs and functionally contextual factors relating to consumptible attributes. The present invention may yet further be advantageous in that it may encourage consumers to provide full specifications for predefined consumptible attributes, survey consumer needs across various consumer categories, obtain information relating to contextual utility of consumptible attributes, and monitor performance of particular consumptibles; this aggregated information may be useful to sellers for further consumptible development. Yet further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
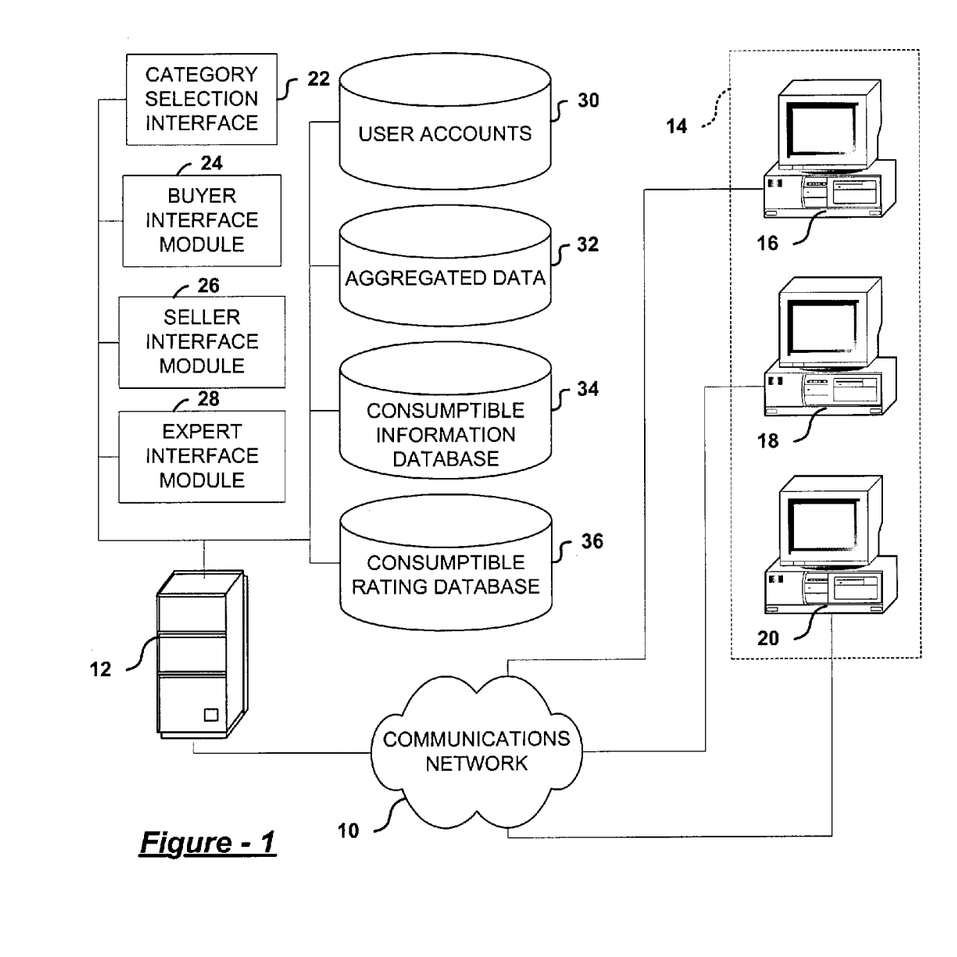
FIG. 1 is a partial-perspective block diagram of the system of the present invention.

FIG. 1 illustrates one embodiment of the system according to the present invention implemented with communications network 10, such as the Internet, that may connect system server 12 with plurality of client terminals 14, which may include expert computer 16, seller computer 18, and consumer computer 20. Server 12 may run software providing category selection interface 22, which may be adapted to allow a user to select a consumptible category, and a plurality of interface modules 24, 26, and 28, which may allow consumers, sellers, and experts to interact with various databases 30, 32, 34, and 36. Consumer interface module 24, for example, may permits a consumer using consumer computer 20 to create a user account in user accounts database 30 and store consumer category data, such as demographics, psychographics, and ethnograhics, therein. It also may allow the consumer to search consumptible rating database 36 by prioritizing consumer needs associated with a consumer-specified category, and store data relating to consumer needs in aggregated data database 32. Similarly, seller interface module 26 may permit a seller using seller computer 18 to create an account in user accounts database 30 and store a consumptible identity and detailed specs for a particular consumptible in consumptible information database 34. Further, expert interface module 28 may permit an expert using expert computer 16 to access consumptible information database 34 in a consumptible category designated in an expert account of user accounts database 30, and to provide rating scales and/or relationships to consumptible rating database 36 for the corresponding consumptible category. Categorized weights reflecting expert knowledge relating to a consumptible category and stored in a corresponding expert account may control the degree to which an opinion of a particular expert influences a particular category.

Figure 2:
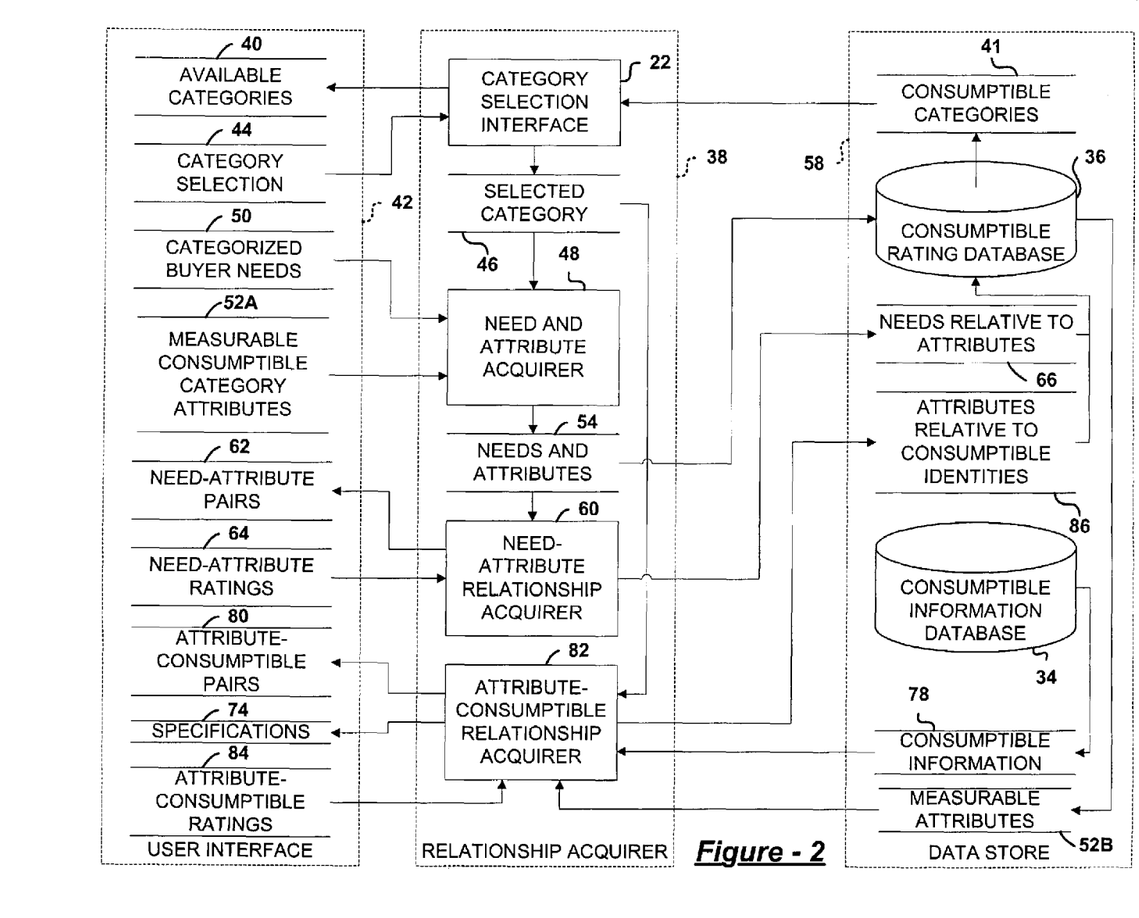
FIG. 2 is a block diagram depicting system processes according to a relationship acquisition procedure in accordance with the present invention.

FIG. 2 illustrates a sub-embodiment of a relationship acquisition process involving experts in accordance with the present invention. For example, category selection interface 22 of relationship acquisition module 38 may obtain consumptible categories 39 from consumptible rating database 36 and communicate available categories 40 to an expert via user interface 42. The expert may respond via interface 42 with a category selection 44, and a selected category 46 may in turn be communicated to rating scale acquisition module 48. Module 48 may further be receptive of expert-defined consumer needs 50 and measurable consumptible attributes 52A for selected category 46, and needs and attributes 54 may be output in the form of a rating scale illustrated with reference to FIG. 3A. Therein, consumer needs may related to consumptible attributes as rows and columns in matrix 56 for the selected category, and this rating scale may stored in consumptible rating database 36 (FIG. 2) of data store 58, and further communicated to need-attribute relationship acquisition module 60. Module 60, in turn, may communicate combinatorial need-attribute pairs 62 to the expert with a request for a numerical rating 64 expressing an expert judgment of a relationship strength expressing how well a consumptible attribute meets a consumer need. Information relating needs to attributes 66 may then be stored as relationships 67 (FIG. 3) in corresponding cells 68 of matrix 56.

Figure 5:
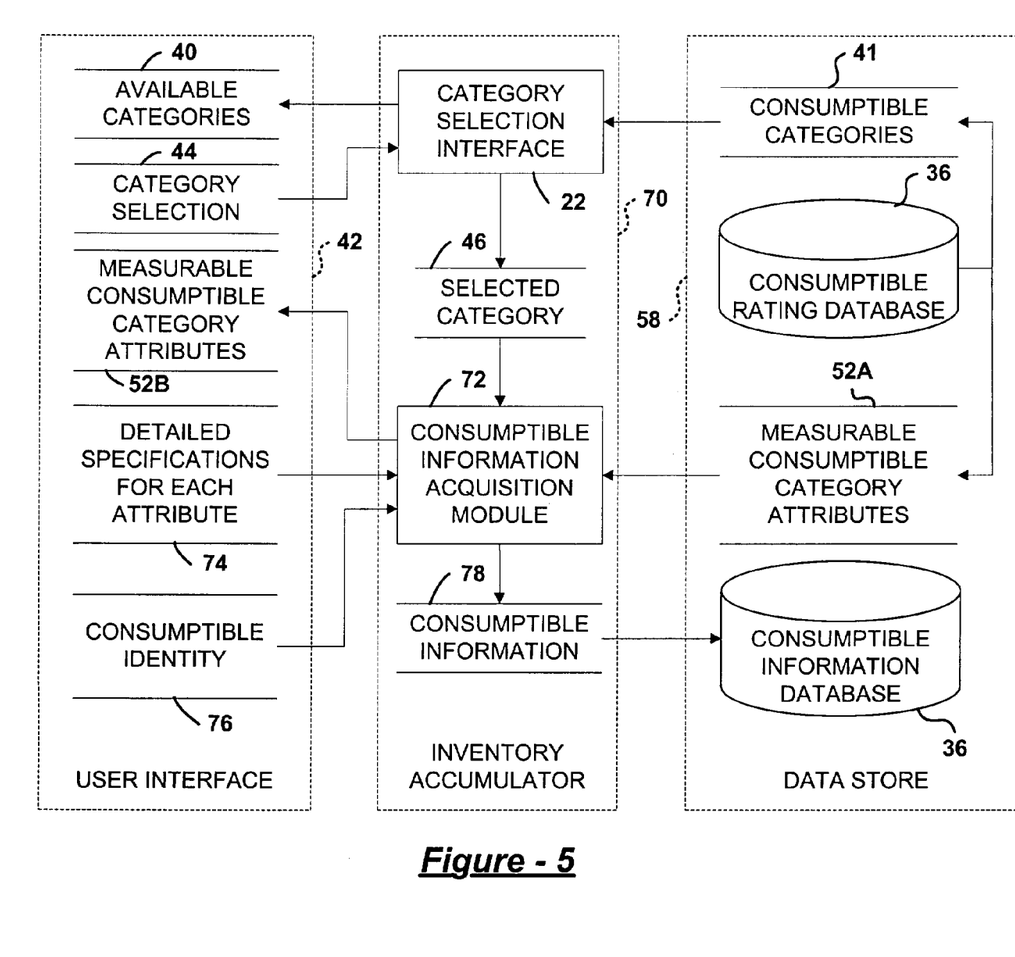
FIG. 5 is a block diagram depicting system processes according to a consumptible information acquisition process in accordance with the present invention.

FIG. 5 illustrates a sub-embodiment of a consumptible information acquisition process involving sellers according to the present invention. Therein, category selection interface 22 of inventory accumulator 70 may communicate consumptible categories 41 to a seller as available categories 40 via user interface 42. The seller may respond with a category selection 44, and selected category 46 may be communicated to consumptible information acquisition module 72. Corresponding measurable consumptible category attributes 52A of consumptible rating database 36 may be retrieved by module 72 and communicated to the seller at 52B via interface 42. In response to the resulting prompts, the seller may provide detailed consumptible specifications 74 for each consumptible attribute associated with the selected category, as well as the consumptible identity 76. Acquired consumptible information 78 may then be stored in consumptible information database 34 of data store 58.

Figure 3A:
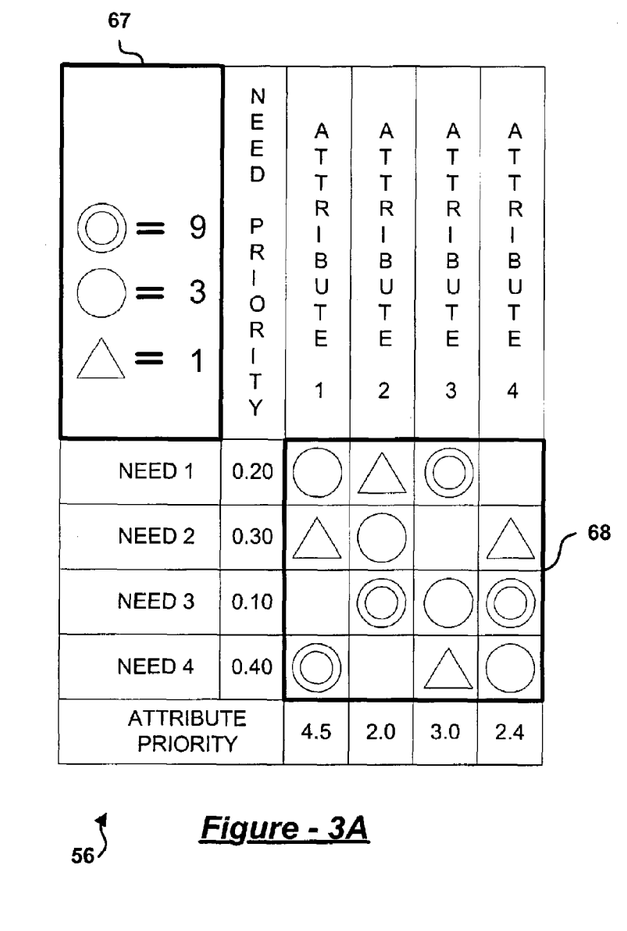
FIG. 3A is a block diagram depicting need to attribute relationship strengths stored in a consumptible rating database for use with the present invention.
Figure 3B:
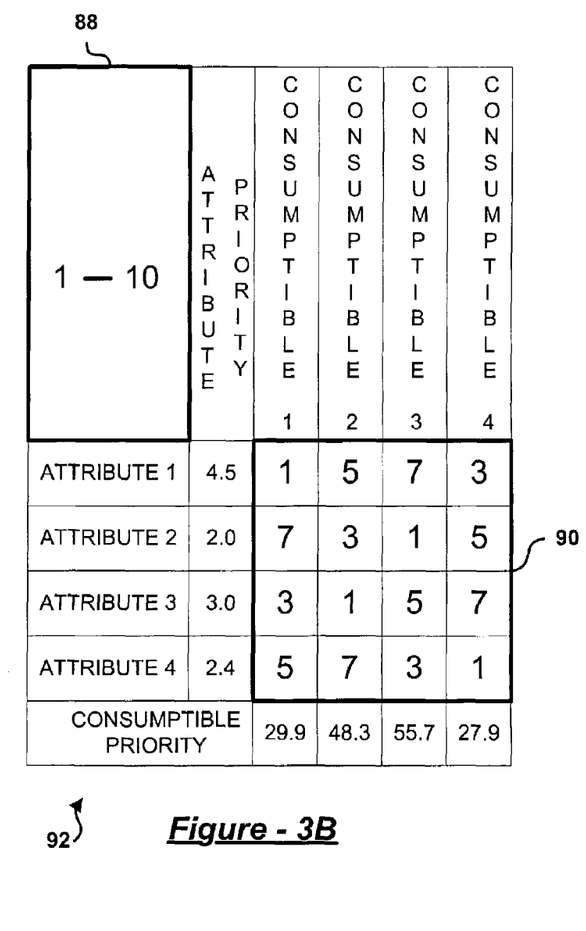
FIG. 3B is a block diagram depicting relative consumptible attribute performance values stored in a consumptible rating database in accordance with the present invention.

Returning to FIG. 2, a revisiting expert and/or subsequently contributing expert selecting a consumptible category 46 having consumptible information already stored in consumptible information database 34 may further receive combinatorial attribute and consumptible identity pairs 80 for selected category 46 from attribute-consumptible relationship acquisition module 82 based on attributes 52B and consumptible information 78 of consumptible information database 34. The expert may further receive detailed specifications for each attribute and consumptible identity associated with selected category 46 based on consumptible information 78. The expert may respond to the resulting prompts with a numerical rating 84 indicating relative, contextual utility of a particular consumptible's actual performance value with respect to a consumptible attribute of the category. Information relating attributes to consumptible identities 86 may then be stored as relationships 88 (FIG. 3) in corresponding cells 90 of matrix 92 associated with selected category 46 (FIG. 2) in consumptible rating database 36.

Information 86 respective of a particular attribute may constitute a utility curve. For example, if a consumptible attribute corresponds to towing capacity of a vehicle, and a number of classes of recreational equipment increases exponentially over a linear weight range, and then decreases logarithmically over a higher weight range, then this information may be reflected in the expertly defined relationships between towing capacity and consumptible identifications. Thus, a vehicle able to tow most recreational vehicles in addition to most trailers may have twice the score respective to towing capacity compared to a vehicle with ninety-percent of the same towing capacity that can only haul small recreational equipment and one class of moving trailer. Similarly, a vehicle with ten times the towing capacity that can only tow ten percent more classes of equipment may have only a slightly higher score respective to towing capacity. As a result, the expert may control for relative utility of consumptibles in a quantifiable functional context independently of subjectively perceived consumer needs.

Figures 4A, 4B, 4C:
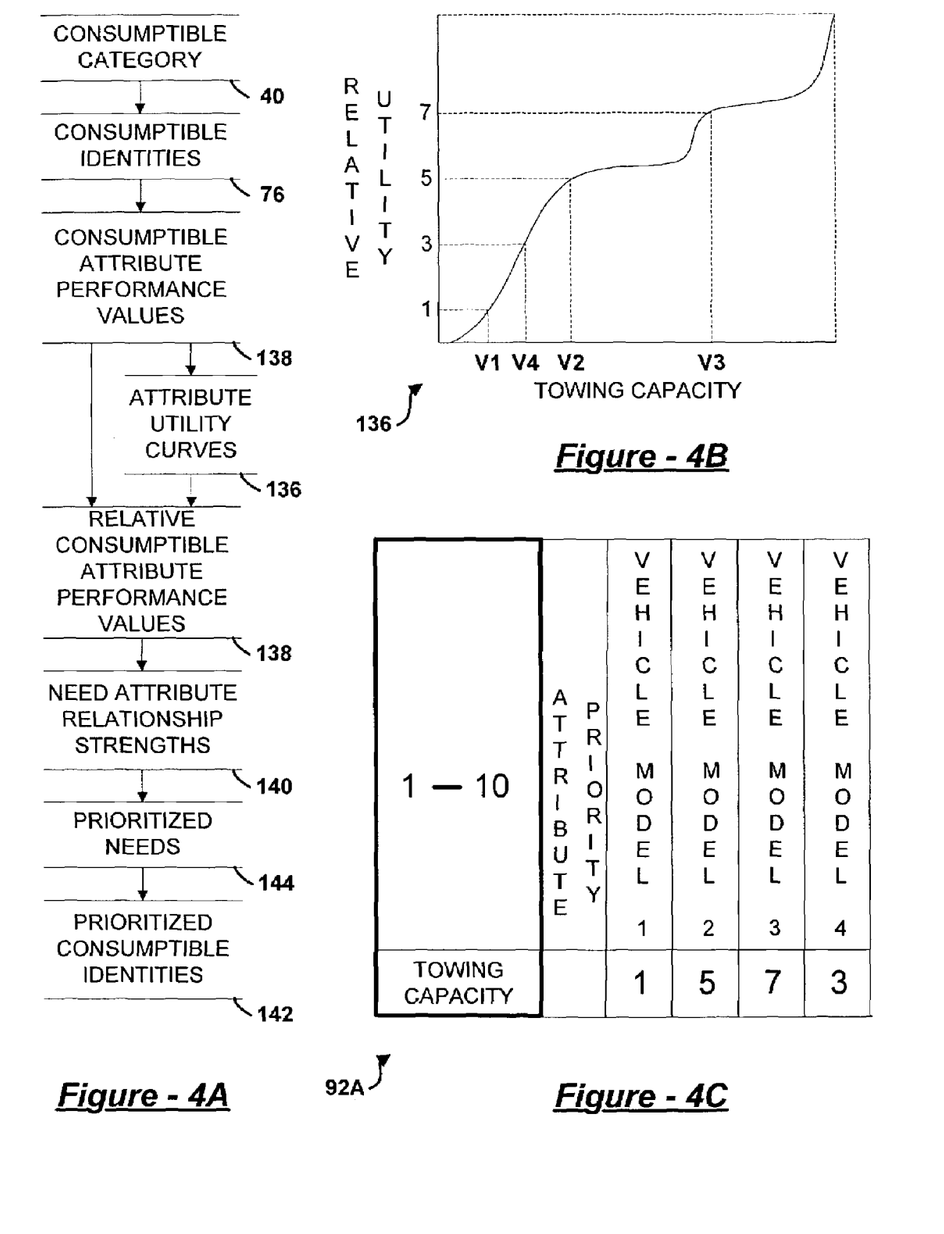
FIG. 4A is a data flow diagram depicting data progression in accordance with the present invention.
FIG. 4B is a graph depicting a utility curve in accordance with the present invention.
FIG. 4C is a block diagram depicting relative consumptible attribute performance values generated by use of the utility curve of FIG. 4B.

Alternatively, experts may be asked to develop an actual utility curve 136 (FIG. 4B). Accumulated data from the weighted experts may be compiled into a map or table as graphed in FIG. 4B. Then, a function may be implemented to populate a row of a matrix 42A for a consumptible category attribute, such as towing capacity of a vehicle, relative to particular vehicle models V1-V4 (FIG. 4B) having actual performance values specified for the attribute; the actual performance values may be specified, for example, by sellers at a time of registration of the vehicle models in association with the consumptible category. As a result, consumptible categories 40 (FIG. 4A) may point to consumptible identities 76, which may in turn have actual performance values 138 specified for the consumptible attributes of the categories according to specifications provided by sellers. These actual performance values may be filtered through an expertly provided utility curve 136 and/or interpreted by experts based on relative utility to arrive at relative consumptible attribute performance values 138 specified for the consumptible attributes of the categories relative to the consumptible identities of the categories. In turn, need to attribute relationship strengths 140 may be used in conjunction with the relative consumptible attribute performance values 138 to identify prioritized consumptible identities 142 for a category based on prioritized consumer needs 144 for the category.

Figure 6:
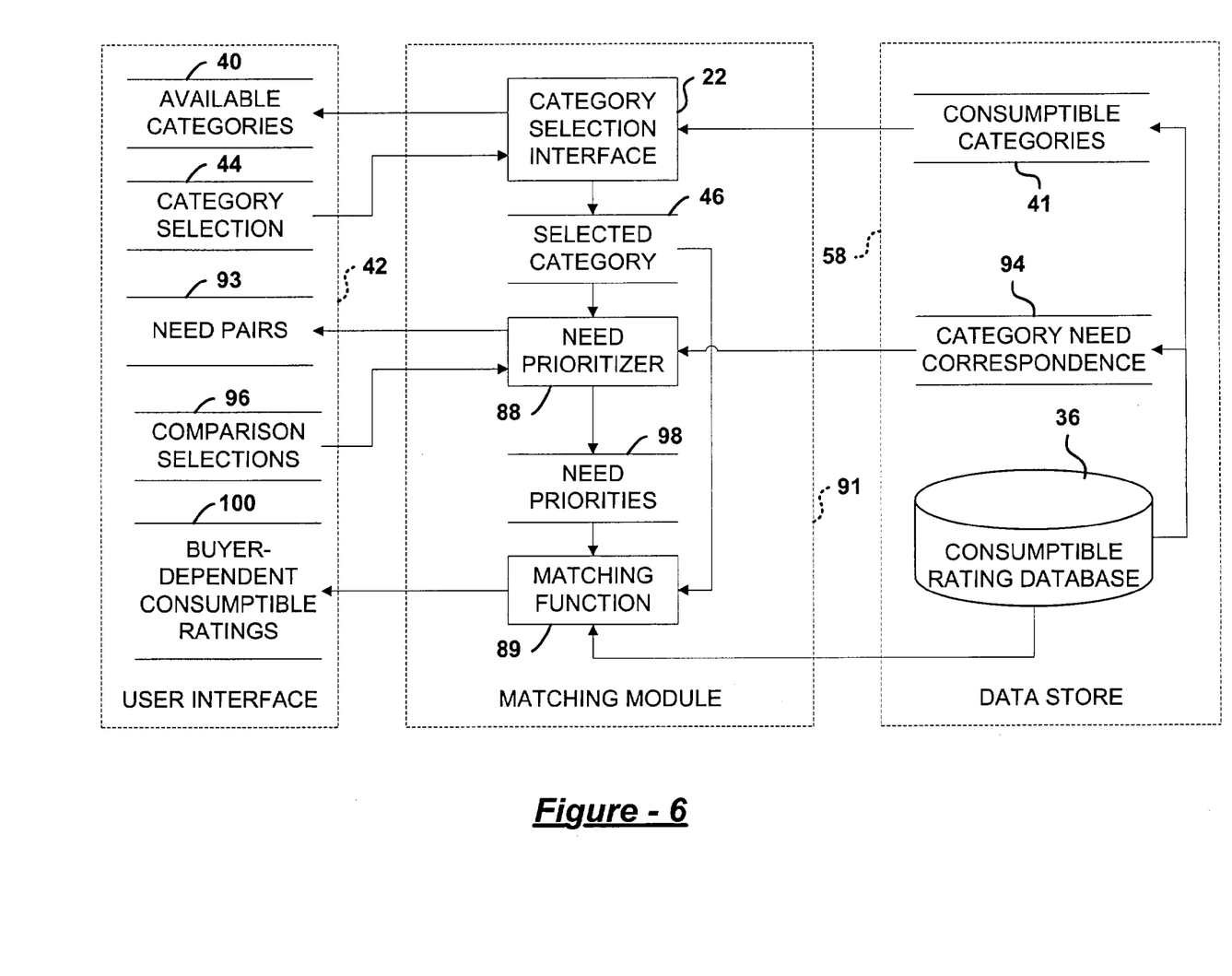
FIG. 6 is a block diagram depicting system processes according to a consumptible identification procedure in accordance with the present invention.

FIG. 6 illustrates a sub-embodiment of a consumptible identification procedure according to the present invention. Therein, a consumer may receive a list of available consumptible categories 40 via user interface 42 from category selection interface 22 based on designated consumptible categories 41 of data store 58. The consumer's category selection 44 may result in communication of selected category 46 to need prioritization module 88 and matching function 89 of matching module 91. Need prioritization module 88 may communicate combinatorial need pairs 93 to the user based on selected category 46 and needs 94 associated with selected category 46 according to consumptible rating database 36 of data store 58. Combinatorial need pairs may provide a rating scale to the particular consumer that permits the particular consumer to perform need to need comparisons with respect to the combinatorial pairs of consumer needs using, for example, drag bars permitting the consumer to visually and intuitively illustrate a proportion of priority divided between competing consumer needs. The resulting comparison selections 96 communicated to need prioritization module 88 are particularly well suited to obtaining ratio scale numbers that may be used to compute the prioritization 98 of consumer needs based on the need to need comparisons as a row average of normalized columns, and the prioritization of consumer needs may further be communicated to matching function 89. In turn, matching function 89 may access consumptible rating database 36 of data store 58 based on selected category 46 and prioritization 98, and may obtain a consumer-dependent rating of consumptibles 100 for the category that may be communicated to the consumer via interface 42.

In an example of operation according to the present invention, a consumer selecting a consumptible category corresponding to "automobiles" may be presented with a checklist including dozens of selectable consumer needs relating to the "automobiles" category. In response, the consumer may select four of these needs, including "low price", "easy to drive", "stylish", and "reliable". The consumer may next be presented with a visual representation of combinatorial pairs of consumer needs with color coded drag bars expressing a bivalent spectrum. The consumer may drag the bars left or right for each combinatorial pair to express a priority-based distribution of comparative importance value for each need compared to every other need of the category. With four needs, there are six combinatorial pairs. A row average may be computed for each consumer need based on the comparisons, and the "need priority" column of matrix 56 (FIG. 3) may be populated with values representing a percentage of priority placed on the corresponding consumer needs by the particular consumer. These scalar values may then be multiplied by scalar values stored in cells 68 in accordance with relationships 67, and the column results for each attribute, such as "drag coefficient", "horse power", "price with option package", and "lemon law claims per annum", may be added together to obtain consumer-specific priority values which populate the "attribute priority" row. These attribute priorities may then be used to populate the attribute priorities column of matrix 92, and may similarly be multiplied by scalar values of cells 90 and added together for each consumptible identity to obtain consumer-specific priority values that may populate the "consumptible priority" row. These consumptible priorities may then be used as consumptible ratings, and consumptible identities may be communicated to the consumer together with their ratings, a bar graph visually depicting their ratings, and a pie chart visually depicting the computed values representing percentage of priority placed on the corresponding consumer needs by the particular consumer that resulted in the consumer-specific ratings.

Figure 7:
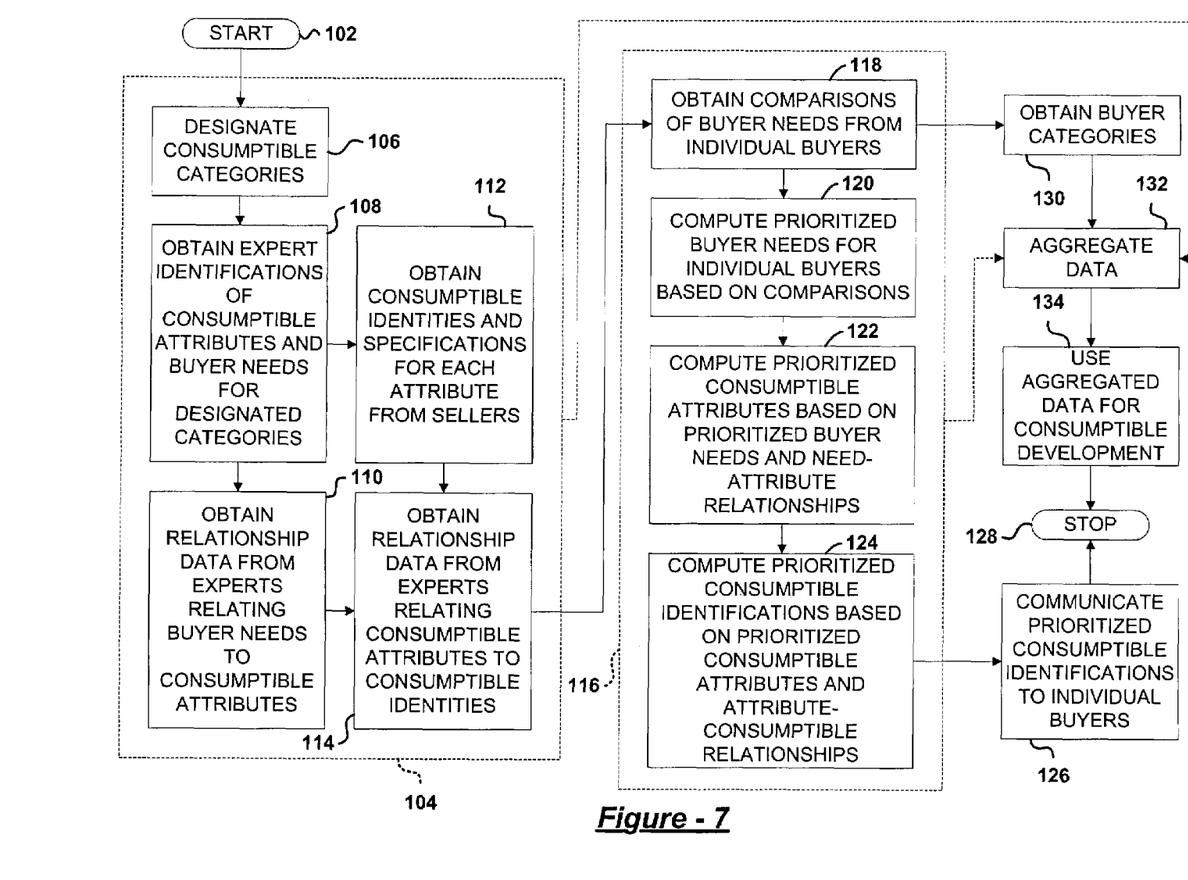
FIG. 7 is a flow diagram depicting a method of consumptible identification for use with a computer network in accordance with the present invention.

FIG. 7 illustrates an embodiment of a method of the present invention. Beginning at 102 the method may proceed with development of consumer needs related to consumptible attributes for one or more consumptible categories at step 104. Thus, consumptible categories may be designated at step 106, and expert identifications of consumptible attributes and consumer needs may be obtained for each designated category at step 108. Step 108 may be performed separately for each category, with a primary expert for the category defining the columns and rows of a resulting matrix. The primary expert for each category may also provide initial relationship data for the category that relate the consumer needs to the consumptible attributes in step 110. Then, additional experts may provide more relationship data in step 110 for the category that may be used to adjust the initial relationship data according to weighted values assigned to the contributing experts based on their knowledge with respect to the particular consumptible category. Meanwhile, the attributes defined for a consumptible category may be used to prompt a seller of a consumptible in the category for detailed consumptible specifications for each attribute at step 112. Then, the specifications may be used by knowledgeable experts in step 114 when obtaining relationship data from the experts relating consumptible attributes to consumptible identities based on relative utility of performance values with respect to the consumptible category attributes. These experts may be different from the experts who provide relationships between consumer needs and consumptible attributes, and may be employed to development utility curves for various consumptible attributes relating actual performance value to actual functional value within a market context as previously discussed. Then, the relationships between the consumptible attributes and the consumptible identities may be mapped in an automated fashion using the performance values expressed in the detailed specifications to obtain a relative functional value using the utility curve that identifies a relationship between the consumptible identity and the consumptible attribute.

With relationships between consumer needs and consumptible identities expertly defined at 104, consumptible identities may be matched to particular consumers based on a consumer-specific prioritization of consumer needs at step 116. Accordingly, need to need comparisons of combinatorial pairs of consumer needs may be obtained from individual consumers at step 118, and consumer-specific prioritizations of consumer needs may be computed at step 120 based on the need to need comparisons. Next, consumer-specific prioritizations of consumptible attributes may be computed at step 122 based on the consumer specific prioritizations of consumer needs and expertly defined relationships between consumer needs and consumptible attributes. Then, individual existing consumptibles may be rated for individual consumers by computing consumer-specific prioritizations for consumptible identities at step 124 based on the consumer-specific prioritizations of consumptible attributes and the expertly defined relationships between the consumptible attributes and the consumptible identities. These consumer-specific ratings may then be communicated to the individual consumers at step 126, with the method ending at 128.

The method of the present invention have further steps directed to the consumptible development side, such as obtaining consumer category information (demographics, psychographics, ethnograhics) at step 130. Also, data may be aggregated at step 132, including consumer category information obtained in step 130 and consumer needs obtained in step 116, and this aggregated data may be used at step 134 to assist in redeveloping existing consumptibles and/or developing new consumptibles. For example, the consumer needs and consumer category information may be used to obtain consumer category specific prioritizations of consumer needs for various consumptible categories. Further, performance of a particular consumptible relative to commonly expressed consumer needs may be obtained on step 116 and aggregated in step 132, and this information may be used in step 134 to identify consumptibles in need of redevelopment. Still further, the detailed specifications obtained in step 104 may be aggregated at step 132 and used to provide information on existing consumptible attributes that developers may otherwise have to obtain by other means. Yet further, the expertly developed matrices constructed in step 104 to relate consumer needs to consumptible attributes can be aggregated at step 132 and used as part of a House of Quality as known in the art of Quality Function Deployment (QFD) to assist in developing consumptibles. The utility curve expressed in the relationships obtained in step 114 may further be used in a cost-benefit analysis to identify an optimal consumptible attribute value in a given market context.

It is important to note that various alternative embodiments of the present invention may be implemented to service consumers of varying levels of expertise relating to one or more consumptible categories. As a result, the present invention may be implemented to allow a consumer to specify a specific and/or range of performance values for one or more consumptible attributes, and combine these limitations with the prioritization of needs relating to consumer benefits derived from one or more consumptible attributes. For example, a consumer may be initially presented with a list of consumptible needs, such as doors, comfort, speed, and towing capacity, for a selected category, such as automobiles. In this example, the consumer may be allowed to select to express a specific number of doors for the vehicle, such as four, and further to select to compare two of the needs, such as comfort and speed. In this case, the matching module may filter the consumptible identities of the category by constructing, on the fly, a matrix of automobile models having four doors related to all of the consumptible attributes for the category. The automobile models may subsequently be related to the attributes using the appropriate utility curves. The prioritization of the two needs may then be related to the attributes, and a prioritization of automobiles having four doors obtained. It should be readily understood that equivalent filtering methods may include rescoring of prioritized consumptible identities based on the specified performance value, and/or other ways of rendering non-conforming consumptible identities ineligible.

The description of the invention is merely exemplary in nature and, thus, variations that do not depart from the gist of the invention are intended to be within the scope of the invention. For example, the present invention may be less advantageously accomplished by relating consumer needs directly to consumptible identities, without the interim steps of relating to consumptible attributes and using utility curves. Also, actual performance values of consumptibles may alternatively be linearly mapped to consumptible category attributes.

Further, the prioritizations of consumer needs may be accomplished by other means than a need to need comparison, and use of a pie chart to display the needs with pie piece dividers that can be dragged to adjust the priorities is another example of an intuitive graphical user interface for obtaining the consumer-specific priorities. Still further, various alternative embodiments may communicate the results in additional ways, such as by normalizing priorities associated with consumptible attributes and/or consumptible identities and graphically displaying them to consumers as pie charts. Still further, although two-dimensional matrices may be used to visually communicate the processes of the present invention, it should be readily understood that various data structures and complementary referencing algorithms can be employed to accomplish the present invention in a variety of ways, as with lookup tables and/or vectors with three or more dimensions. Yet further, the present invention may be employed in various market contexts including, for example, contract evaluation. In this embodiment, equipment specifications may listed on rows of a matrix as consumer needs, and design elements for meeting the consumptible specifications that make up a given proposal may be listed on the columns as consumptible attributes. In this context, the consumptible category may corresponds to a contract to supply new equipment, and the proposal submitting entity can perform the relationship matrix work. However, the consumer, the one issuing the Request For Proposal (RFP) and needing the new equipment, may be able to have their experts also perform relationship matrix work to judge how well a proposal meets the RFP. Such variations are not to be regarded as a departure from the spirit and scope of the invention.

What is claimed is:

1. A consumptible identification system for use with a computer network, comprising:
   a processor; and
   a memory, in communication with the processor, storing:
   a consumptible rating database of consumptible identities related to consumer needs associated with consumptible categories, wherein the consumer needs relate to consumer benefits derived from at least two consumptible attributes associated with at least two of the consumptible categories, wherein said consumptible rating database relates each of first and second ones of the consumer needs to multiple consumptible attributes for corresponding consumptible categories, and relates each of first and second ones of the multiple consumptible attributes to multiple consumptible identities for corresponding consumptible categories, the relationships having strengths identifying a relativity of relationship between particular consumer needs associated with a particular consumptible category and particular consumptible attributes associated with the particular consumptible category, and the particular consumptible identities of the particular consumptible category having performance values relative to the particular consumptible attributes of the particular consumptible category; and
   a consumer interface module adapted to: obtain a prioritization of the particular consumer needs associated with the particular consumptible category from a particular consumer without the particular consumer having to directly specify a prioritization of the particular consumptible attributes; match a particular individual consumptible identity to the particular consumer based on the prioritization of the particular consumer needs, relationships between the particular consumer needs and the particular consumptible attributes, and relationships between the particular consumptible attributes and the particular consumptible identities associated with the particular consumptible category in said consumptible rating database; and communicate the particular individual consumptible identity to the particular consumer; wherein the prioritization of the particular individual consumer expresses a strength of preference of the particular consumer pertaining to at least one particular individual consumer need associated with the particular consumptible category relative to at least one other particular individual consumer need associated with the particular consumptible category, and said consumer interface module is further adapted to communicate combinatorial pairs of consumer needs associated with the particular consumptible category to the particular consumer, provide a first rating scale to the particular consumer that permits the particular consumer to perform need to need comparisons with respect to the combinatorial pairs of consumer needs, and compute the prioritization of the particular consumer needs based on the need to need comparisons;

wherein said consumptible rating database stores: (a) a second rating scale relating the particular consumer needs to the particular consumptible attributes as rows and columns in a first matrix for the particular consumptible category in which cells of the first matrix store first numerical ratings expressing relationship strengths indicating how well the particular consumptible attributes meet the particular consumer needs; (b) a utility curve relating the particular consumptible identities to the particular consumptible attributes; and (c) a second matrix for the particular consumptible category in which cells of the second matrix store second numerical ratings expressing relationship strengths indicating contextual utility of consumptibles' performance values with respect to the particular consumptible attributes of the particular consumptible category; and wherein said consumer interface module computes need priorities as a row average of normalized columns, determines attribute priorities by summing products of the need priorities and the first numerical ratings, and determines consumptible priorities by summing products of the attribute priorities and the second numerical ratings.

2. The system of claim 1 wherein the particular consumer needs are preselected to be subjectively perceptible to consumers.

3. The system of claim 1 wherein the particular consumptible attributes are objectively measurable in a directly quantifiable fashion.

4. The system of claim 1 wherein said consumptible rating database has stored therein detailed specifications, obtained from sellers, of consumptibles having the particular consumptible identities associated with the particular consumptible category.

5. The system of claim 1 wherein the memory further stores a category selection interface adapted to communicate a plurality of consumptible categories to a user and to receive a consumptible category selection from the user.

6. The system of claim 1 wherein said consumer interface module is further adapted to obtain a prioritization of the particular consumer needs that expresses a strength of preference of the particular consumer pertaining to one particular individual consumer need associated with the particular consumptible category relative to another particular individual consumer need associated with the particular consumptible category.

7. The system of claim 1 wherein the memory further stores an expert interface module adapted to obtain expert identifications of the particular consumer needs associated with the particular consumptible category, to obtain expert identifications of strengths of relationships between the particular consumptible attributes associated with the particular consumptible category and the particular consumer needs associated with the particular consumptible category, and to inform said consumptible rating database.

8. The system of claim 7 wherein said expert interface module is further adapted to obtain expert identifications of existence of relationships between the particular consumer needs associated with the particular consumptible category and the particular consumptible attributes associated with the particular consumptible category.

9. The system of claim 7 wherein said expert interface module is further adapted to obtain expert identifications of relationships between the particular consumptible attributes associated with the particular consumptible category and the particular consumptible identities associated with the particular consumptible category based on relative utility of consumptibles in a quantifiably functional context.

10. The system of claim 7 wherein said expert interface module is further adapted to obtain expert identifications of the contextual utility of consumptibles' performance values with respect to the particular consumptible attributes of the particular consumptible category.

11. The system of claim 7 wherein the memory further stores a seller interface module adapted to obtain a seller's consumptible identity from a seller with respect to a consumptible of the seller falling in the particular consumptible category, to obtain detailed consumptible specifications from the seller with respect to the particular consumptible attributes associated with the particular consumptible category, and to inform a consumptible information database accessible to said expert interface module.

12. The system of claim 1 wherein said consumer interface module is further adapted to recommend, to the particular consumer, at least one of the particular consumptible identities ranked according to the particular consumer's preferences as to the particular consumer needs associated with the particular consumptible category.

* * * * *